United States Patent
Bursack et al.

[15] 3,658,657
[45] Apr. 25, 1972

[54] SEPARATION AND RECOVERY OF 1,1,1-TRICHLOROETHANE BY EXTRACTIVE DISTILLATION

[72] Inventors: Kenneth F. Bursack, Wichita; Earnest L. Johnston, Clearwater, both of Kans.

[73] Assignee: Vulcan Materials Company, Birmingham, Ala.

[22] Filed: July 23, 1970

[21] Appl. No.: 57,804

Related U.S. Application Data

[63] Continuation-in-part of Ser. No. 862,950, Oct. 1, 1969.

[52] U.S. Cl. .................................203/51, 203/56, 203/57, 203/58, 203/60, 203/62, 203/63, 260/652 P
[51] Int. Cl. ............................................................B01d 3/40
[58] Field of Search................260/652 P, 658 R, 659 R, 660, 260/662 R, 654 S; 203/58, 57, 56, 51, 60, 63, 62

[56] References Cited

UNITED STATES PATENTS

| | | |
|---|---|---|
| 2,106,158 | 1/1938 | Povenz et al. .....................260/652 P |
| 3,113,079 | 12/1963 | Bergeron et al. .........................203/58 |
| 3,349,008 | 10/1967 | Vives........................................203/60 |
| 3,427,357 | 2/1969 | De Gramont et al...............260/652 P |
| 3,553,275 | 1/1971 | Bhatia ...............................260/652 P |

*Primary Examiner*—Wilbur L. Bascomb, Jr.
*Attorney*—Burns, Doane, Swecker & Mathis

[57] ABSTRACT

1,1,1-Trichloroethane containing chlorohydrocarbon contaminants, principally 1,2-dichloroethane, is purified by extractive distillation, employing as an extraction solvent anisole, isobutyl acetate, epichlorohydrin, a nitroalkane such as nitroethane or 1-nitropropane, or any of the foregoing compounds in compatible, mutually non-reactive mixture with any other of the foregoing compounds or with tetrahydrofurfuryl alcohol or n-butyronitrile.

9 Claims, No Drawings

SEPARATION AND RECOVERY OF 1,1,1-TRICHLOROETHANE BY EXTRACTIVE DISTILLATION

CROSS-REFERENCE

This application is a continuation-in-part of copending application Ser. No. 862,950 filed Oct. 1, 1969.

BACKGROUND OF THE INVENTION

The chlorinated hydrocarbon 1,1,1-trichloroethane, $CH_3CCl_3$, also known as methylchloroform, is used extensively as a non-flammable solvent for degreasing, for cold type metal cleaning, and for cleaning plastic molds. It may be prepared by the thermal chlorination of ethane, or by the action of chlorine on 1,1-dichloroethane, or by the catalytic addition of HCl to 1,1-dichloroethylene. It boils at 74°–75° C. at atmospheric pressure, and has a specific gravity of 1.3492.

In the manufacture of 1,1,1-trichloroethane, various chlorinated hydrocarbons appear as by-products or co-products of the reaction forming small amounts of impurities in the 1,1,1-trichloroethane, from which they are separable by distillation techniques only with great difficulty and expense. A by-product chlorinated compound of which this is particularly true is 1,2-dichloroethane, also known as ethylene dichloride, which has a boiling point of 83°–84° C. and a specific gravity of 1.255. As the proportion of 1,1,1-trichloroethane in a mixture of this compound with 1,2-dichloroethane increases, the separation of the two compounds by simple distillation becomes increasingly difficult. This is especially true in concentration ranges of 1,1,1-trichloroethane in excess of 90 weight percent. On the basis of experimentally determined vapor-liquid equilibrium data, a commercial process for the satisfactory separation of these two compounds would require in excess of 160 trays in distillation columns, which is impractical economically.

The practical difficulty of attempting to separate 1,1,1-trichloroethane from 1,2-dichloroethane by fractional distillation alone can be demonstrated on a laboratory scale. Thus, a 40-tray vacuum-jacketed Oldershaw column was charged with 4 liters of a mixture of 99 weight percent 1,1,1-trichloroethane and 1 weight percent 1,2-dichloroethane. The column was operated batchwise for in excess of 50 hours at a reflux ratio of 100:1. Simultaneous overhead and bottoms samples were taken and analyzed by gas chromatography. The bottoms product showed 99.04 weight percent 1,1,1-trichloroethane and 0.96 weight percent 1,2-dichloroethane. The overhead product still contained 0.10 weight percent of 1,2-dichloroethane. The calculated relative volatility of the trichloro compound to the dichloro compound was 1.08.

In Table 1 below there are set forth in Examples I–IV the results of similar tests made with a vapor-liquid equilibrium still, employing various proportions of trichloro compound and dichloro compound. The relative volatility obtained in Example IV agrees closely with the figure 1.08 obtained as described above.

GENERAL DESCRIPTION OF THE INVENTION

In accordance with the present invention there is provided a novel method for the separation of 1,1,1-trichloroethane from mixtures thereof with 1,2-dichloroethane and/or other chlorinated hydrocarbon impurities, which employs the principle of extractive distillation. In extractive distillation, an auxiliary solvent that forms a nonideal solution with the mixture to be separated is introduced as a second feed at a suitable point of the distillation column. The extraction solvent is one which is also capable of altering the volatility of the desired component of the mixture, by reducing its vapor pressure relative to that of the other components or impurities. The bottoms then consist of the undesired components and the solvent. The latter may be separated in a second column under conditions such that the degree of association between the solvent and the undesired components is reduced, and the solvent can be recovered and reused.

It has been found, in accordance with the invention, that the separation and recovery of 1,1,1-trichloroethane from chlorohydrocarbons boiling higher than 1,1,1-trichloroethane, and particularly from 1,2-dichloroethane, may be performed with unusual effectiveness, using the techniques of extractive distillation, by adding to a mixture of 1,1,1-trichloroethane and other chlorohydrocarbons, an extraction solvent which is one of the following compounds: tetrahydrofurfuryl alcohol, or n-butyronitrile (the use of which two solvents is claimed in parent application Ser. No. 862,950), anisole, isobutyl acetate, epichlorohydrin, a nitroalkane having from two to three carbon atoms per molecule such as nitroethane or 1-nitropropane, or a mixture of any two or more of the foregoing compounds which are compatible with each other and mutually non-reactive.

When using mixtures of solvents, the advantages of each can be utilized while their disadvantages are minimized or avoided. For instance, while epichlorohydrin, nitroethane or nitropropane are among the most effective solvents in bringing about the desired separation of 1,1,1-trichloroethane from 1,2-dichloroethane present in the crude distilland, they tend to polymerize or decompose and, consequently, tend to form undesirable and potentially troublesome deposits in the processing equipment when any such solvent is used by itself. By using such a solvent in combination with one of the more stable but less effective solvents such as isobutyl acetate, it has been found possible to take advantage of the superior effectiveness of the less stable solvent while avoiding the objectionable deposit formation that normally results when it is used by itself. This advantage is obtained because the polymeric or other syrupy or solid residues which are formed from the less stable solvent are maintained in solution due to the presence of the other, more stable solvent such as isobutyl acetate and can ultimately be removed from the mixed solvent when the latter is regenerated in a separate operation.

When a multi-component solvent is used, the mutual proportion of its components can be varied substantially at will although it usually will be advantageous to have not more than about 75 weight percent, preferably from about 10 or 15 percent up to about 50 percent, of the less stable component in the solvent mixture. When a mixed solvent is used, the relative volatility is approximately an average value between the relative volatility values for the individual components.

Obviously, it is not normally desirable to formulate a multi-component solvent from components which tend to react with each other, e.g., to use a mixture of an ester such as isobutyl acetate with an alcohol such as tetrahydrofurfuryl alcohol in view of the possibility of transesterification.

The effective proportion of the stated extraction solvents to be employed relative to the 1,1,1-trichloroethane is not critical, and may be varied within wide limits, depending upon the type and design of the distillation column, the nature of the solvent and of the impurity or impurities to be removed from the crude distilland, distillation conditions, and other variables. Advantageously, however, an amount of solvent is employed ranging from about 25 percent to about 85 percent by weight based on total liquid composition, the optimum concentration depending somewhat upon the particular solvent used and the particular chlorohydrocarbon impurity to be removed. Preferably the solvent concentration lies between about 45 percent and about 70 percent by weight.

Several of the solvents mentioned have been suggested in the prior art stabilizers for chlorohydrocarbons of various types, but the amount used for that purpose is very small, generally 1 percent by weight or less. The proportions required for extractive distillation purposes are far in excess of this stabilizing amount. However, when employed as extraction solvents in accordance with the invention, the aforementioned compounds may also manifest an incidental beneficial stabilizing action.

The extractive solvents employed in the practice of the invention are stable or decompose to only a very small extent under distillation conditions and are easily separated from the various chlorinated hydrocarbons or impurities present in the mixture to be purified.

In carrying out the extractive distillation of 1,1,1-trichloroethane in accordance with the invention, the extraction solvent is advantageously introduced in a continuous stream near the top of the distillation column. The 1,1,1-trichloroethane-chlorohydrocarbon mixture is introduced continuously at a lower level in the column. The 1,1,1-trichloroethane enriched product is continuously removed from one of the trays located above the feed tray for the extraction solvent. The relative locations of the feed and product removal trays depend upon the particular solvent employed. The 1,2-dichloroethane enriched solvent product is removed at the bottom of the column. This bottoms product is then sent to an auxiliary column to recover the 1,2-dichloroethane and the extraction solvent, and the latter is recycled to the extractive distillation column. A slight purge stream removes heavy ends from the bottom of the auxiliary column.

DESCRIPTION OF THE PREFERRED EMBODIMENTS

The following examples illustrate the presently preferred practice of the process of the invention, but are not to be regarded as limiting.

In Table 1 there are summarized the results of tests performed with a vapor-liquid equilibrium still, showing the calculated relative volatility values for 1,1,1-trichloroethane in relation to 1,2-dichloroethane, where no extraction solvent was used, as well as for various extraction solvents and concentrations of the components in the mixtures. Examples I–IV show the relative volatility calculated from the equilibrium still data for the system 1,1,1-trichloroethane/1,2-dichloroethane, with no extraction solvent present. Examples V–XIV show the results obtained employing each of the extraction solvents: epichlorohydrin, n-butyronitrile, tetrahydrofurfuryl alcohol, anisole, isobutyl acetate, nitroethane and 1-nitropropane. Examples VII–X show the effect of varying the composition of the mixture to be separated or the proportion of solvent. Thus, Example VIII shows the effect of a higher concentration of 1,1,1-trichloroethane removal of bottoms product with rate and temperature measurement. A 20-tray vacuum jacketed 1-inch glass, Oldershaw column was attached to the flask. A vacuum jacketed feed inlet section was attached to the top of the 20-tray section. A 10-tray vacuum jacketed 1-inch Brunn, glass bubble cap column was installed on top of the feed section. Another vacuum jacketed feed inlet section was placed on top of the ten tray section. A vacuum jacketed liquid dividing automatic head was joined to the top of the upper most feed section. The reflux ration was controlled by a timer. The two feed streams were preheated to the temperature of the material refluxing in the column.

Tetrahydrofurfuryl alcohol was fed at the top feed inlet at 268 grams per hour. The chlorinated hydrocarbon feed was a mixture of 95.9 weight percent 1,1,1-trichloroethane and 4.1 weight percent 1,2-dichloroethane. This was metered into the lower feed inlet at 56 grams per hour. The bottoms product was removed at the rate of 270 grams per hour. The overhead product was removed at a reflux ratio of 3:1 and a rate of 54 grams per hour. After several hours of operation and establishment of steady state, analysis showed the overhead composition to be 98.7 weight percent 1,1,1-trichloroethane, 0.8 weight percent 1,2-dichloroethane and 0.5 weight percent tetrahydrofurfuryl alcohol. The bottoms product contained less than 0.1 weight percent 1,1,1-trichloroethane, 1.0 weight percent 1,2-dichloroethane and the balance was tetrahydrofurfuryl alcohol.

EXAMPLE XVII

The same equipment employed in Example XII was used in this experiment except the 10-tray Brunn bubble cap column was replaced with a 10-tray Oldershaw column. The column was operated the same as in Example XII except that a reflux ratio of 4:1 was used. Tetrahydrofurfuryl alcohol was again employed as the extractant and the feed rates were very nearly the same as used in Example XII. After equilibrium was established, samples of the overhead and bottoms products were taken. Analysis showed the overhead composition to be

TABLE 1

Extractive distillation separation of 1,1,1-trichloroethena from 1,2-dichloroethane (Vapor-liquid equilibrium still data)

| Example number | Extractant | Liquid phase composition, wt. percent | | | Relative volatility [1] | Pressure mm. Hg |
|---|---|---|---|---|---|---|
| | | Extractant | 1,1,1-tri | 1,2-di | | |
| I | None | | 70.06 | 29.94 | 1.20 | 730.3 |
| II | do | | 79.11 | 20.89 | 1.16 | 729.7 |
| III | do | | 96.80 | 3.20 | 1.10 | 727.6 |
| IV | do | | 99.24 | 0.76 | 1.08 | 726.4 |
| V | Epichlorohydrin | 42.79 | 54.43 | 2.78 | 1.68 | 711.5 |
| VI | n-Butyronitrile | 67.18 | 30.62 | 2.20 | 2.33 | 717.3 |
| VII | Tetrahydrofurfuryl alcohol | 56.85 | 25.15 | 18.00 | 1.79 | 727.2 |
| VIII | do | 56.00 | 34.72 | 9.23 | 1.95 | 727.0 |
| IX | do | 25.72 | 73.33 | 0.95 | 1.37 | 723.0 |
| X | do | 62.47 | 37.33 | 0.20 | 1.81 | 723.9 |
| XI | Anisole | 59.96 | 39.09 | 0.95 | 1.50 | |
| XII | Isobutyl Acetate | 57.22 | 40.30 | 2.48 | 1.56 | 727.2 |
| XIII | Nitroethane | 61.13 | 36.74 | 2.13 | 1.99 | 722.7 |
| XIV | 1-Nitropropane | 71.04 | 26.96 | 2.00 | 1.66 | 720.7 |
| XV | {Epichlorohydrin {Isobutyl Acetate | 33.02 } 29.81 } | 34.80 | 2.37 | 1.64 | 716.3 |

[1] Relative volatility was calculated for 1,1,1-trichloroethane relative to 1,2-dichloroethane.

relative to 1,2-dichloroethane with tetrahydrofurfuryl alcohol as the extraction solvent. Example IX indicates the effect of lowering the concentration of extraction solvent in the mixture, which effect is brought out even more clearly by comparison of Example IX with Example X. Example XV shows the results employing a mixed solvent.

The following additional examples using the tetrahydrofurfuryl alcohol in a continuous system illustrate in detail the practice of the invention.

EXAMPLE XVI

The equipment employed consisted of a 2000 ml. three-necked flask for a reboiler. Provision was made for constant 99.1 weight percent 1,1,1-trichloroethane, 0.3 weight percent 1,2-dichloroethane and 0.6 weight percent tetrahydrofurfuryl alcohol. The bottoms product contained 1.8 weight percent 1,1,1-trichloroethane, 12.5 weight percent 1,2-dichloroethane and 85.7 weight percent tetrahydrofurfuryl alcohol. The overall column efficient was estimated at 50 percent and the calculated average relative volatility over the entire range of composition was 1.58.

EXAMPLE XVIII

The utility of isobutyl acetate as an extractive distillation agent is illustrated in the following.

A. Extractive Distillation

Distillation equipment is set up for continuous operation using two fractionating columns with interconnecting piping to permit cross circulation of the columns' bottom streams. One column is used as an extractive distillation tower and the other as a solvent recovery tower. The extractive distillation tower is a Monel metal, 8-inch diameter column with 32 trays and with an internal steam coil in the bottom section for heat input. The solvent recovery tower is a Monel metal, 8-inch diameter column packed with ceramic Raschig rings to form a packed section 20 feet deep. Both columns are operated at an overhead pressure of 10 psig.

Feedstock at 65° C. containing 94.5 weight percent 1,1,1-trichloroethane, 5.2 weight percent 1,2-dichloroethane and 0.3 weight percent other chlorinated compounds is metered to the sixth tray of the extraction tower at a rate of about 8000 grams per hour. Overhead product is drawn from the column at a rate of about 5700 grams per hour under steady state conditions using a 5:1 reflux ratio.

Analysis of the product stream shows a composition of 99.262 weight percent 1,1,1-trichloroethane, 0.2690 weight percent 1,2-dichloroethane, 0.0019 weight percent isobutyl acetate, with 0.467 weight percent of other chlorinated compounds forming the balance.

The extractive distillation tower bottoms is fed to the upper feed point on the solvent recovery tower. This stream is regulated by the extractive distillation tower base level control, and contains primarily isobutyl acetate, with 1,2-dichloroethane, 1,1,1-trichloroethane and low concentrations of other chlorinated compounds. In the solvent recovery tower, these chlorinated compounds are separated from the isobutyl acetate and drawn overhead at a rate of about 2580 grams per hour. The analysis of solvent recovery tower overhead stream shows 83.773 weight percent 1,1,1-trichloroethane, 15.573 weight percent 1,2-dichloroethane, 0.412 isobutyl acetate, and 0.2427 weight percent other chlorinated compounds. The solvent recovery tower bottoms stream, containing nearly pure isobutyl acetate, is preheated to 88° C. and fed back to the extractive distillation tower at the 24th tray for reuse as extractant. The flow rate of this stream is about 20,400 grams per hour.

B. Distillation Without Solvent

For the purpose of general comparison, the data from a continuous distillation run conducted without the use of any extractive solvent are set forth next. In this run, the 32-tray, 8-inch Monel metal column having an internal steam coil in the bottom section for heat input is operated with an overhead pressure of 3.0 psig. Feedstock containing 96.61 weight percent 1,1,1-trichloroethane, 3.33 weight percent 1,2-dichloroethane, and small amounts of other chlorinated compounds, is metered to a feed point near the lower section of the column at a rate of about 3400 grams per hour. Overhead product is drawn at a rate of about 2720 grams per hour. Composition of this stream by analysis was 98.72 weight percent 1,1,1-trichloroethane, 1.17 weight percent 1,2-dichloroethane, with other chlorinated compounds making up the balance. Small amounts of methyl carbitol and styrene oxide were injected into the column reflux stream as stabilizers for the 1,1,1-trichloroethane. Bottoms flow from the column was by level control at an average rate of about 680 grams per hour and contained 87.18 weight percent 1,1,1-trichloroethane, and 10.80 weight percent 1,2-dichloroethane, with the balance composed of heavier chlorinated compounds.

Comparing the results from this run with those obtained by extractive distillation in the presence of isobutyl acetate, it is evident that product purity expressed in terms of the concentration of impurities present was almost twice as good in the extractive distillation run than in the straight distillation run even though the concentration of impurities in the feedstock as well as the rate of feed to the distillation column were very substantially lower in the latter than in the former run.

EXAMPLE XIX

The utility of a mixture of isobutyl acetate and epichlorohydrin as an extractive distillation agent for the separation of 1,1,1-trichloroethane, and 1,2-dichloroethane is illustrated in the following data:

Using the two-column distillation apparatus described in Example XVIII, Part A, a feedstock consisting by analysis of 94.524 weight percent 1,1,1-trichloroethane, 4.979 weight percent 1,2-dichloroethane, with 0.497 weight percent other compounds, is metered to the sixth tray of the extractive distillation column at a rate of about 8000 grams per hour and at a temperature of 65° C. and an overhead pressure of —¾ psig. Overhead product is drawn at a rate of about 5700 grams per hour with a 5:1 reflux ratio.

Analysis shows a product composition of 99.213 weight percent 1,1,1-trichloroethane, 0.1599 weight percent 1,2-dichloroethane, 0.0175 weight percent isobutyl acetate, 0.2037 epichlorohydrin, with other chlorinated compounds making up the balance.

The bottoms flow, containing primarily isobutyl acetate and epichlorohydrin with some 1,2-dichloroethane and 1,1,1-trichloroethane, is fed by level control to the upper of two feed points on the solvent recovery column where the chlorinated compounds are separated from the solvent mixture and drawn overhead at an average rate of about 2520 grams per hour. This flow is composed of 81.754 weight percent 1,1,1-trichloroethane, 16.287 weight percent 1,2-dichloroethane, 0.385 weight percent isobutyl acetate, 1.424 weight percent epichlorohydrin, and the balance other chlorinated compounds. The solvent recovery column is operated at the same overhead pressure as the distillation column.

The bottoms stream of the solvent recovery tower containing 57.164 weight percent isobutyl acetate, 41.284 weight percent epichlorohydrin, 0.409 weight percent n-butyl acetate and the remainder other heavier components is preheated to 88° C. and recycled to the 24th tray of the extractive distillation tower for reuse as extractant. The flow rate of this stream is about 20,400 grams per hour.

It can be seen that product purity in terms of total impurities present is substantially as good here as in Example XVIII, Part A, but that the concentration of 1,2-dichloroethane in the product is significantly lower when the mixed solvent is used as the extractive distillation agent.

The invention is particularly pointed out in the appended claims.

What is claimed is:

1. Method for the separation and recovery of 1,1,1-trichloroethane from chlorohydrocarbon impurities contained therein comprising the steps of:
    a. introducing into a distilland mixture of 1,1,1-trichloroethane and a higher boiling chlorohydrocarbon contaminant an extractive amount of extraction solvent selected from the group consisting of nitroethane, 1-nitropropane, epichlorohydrin, anisole, isobutyl acetate and mixtures of any of said solvents with any other of said solvents or with n-butyronitrile or tetrahydrofurfuryl alcohol;
    b. distilling the resulting solvent-containing distilland to separate a 1,1,1-trichloroethane enriched vapor therefrom;
    c. condensing said enriched vapor to recover purified 1,1,1-trichloroethane.

2. The method of claim 1 in which the proportion of said extraction solvent ranges from about 25 percent to about 85 percent by weight relative to the 1,1,1-trichloroethane present.

3. The method of claim 2 in which said extraction solvent enriched with chlorohydrocarbons is removed from the system and the solvent is separated and recycled to the distillation mixture.

4. The method of claim 2 in which the chlorohydrocarbon contaminant is principally 1,2-dichloroethane.

5. The method of claim 4 in which the extraction solvent comprises isobutyl acetate.

6. The method of claim 4 in which the extraction solvent is a mixture comprising not less than 50 percent isobutyl acetate and from 10 percent to 50 percent of either epichlorohydrin or nitroethane.

7. The method of claim 4 in which the extraction solvent comprises a nitroalkane having from two to three carbon atoms per molecule.

8. The method of claim 4 in which the extraction solvent is a multicomponent solvent comprising n-butyronitrile.

9. The method of claim 4 in which the extraction solvent comprises epichlorohydrin.

* * * * *